United States Patent [19]

Stine

[11] Patent Number: 4,915,496

[45] Date of Patent: Apr. 10, 1990

[54] MOTORIZED BOTTOM MASKING DEVICE FOR WIDE AND/OR CURVED MOTION PICTURE SCREENS

[75] Inventor: James G. Stine, Allentown, Pa.

[73] Assignee: Automatic Devices Company, Allentown, Pa.

[21] Appl. No.: 187,954

[22] Filed: Apr. 29, 1988

[51] Int. Cl.$^4$ .............................................. G03B 37/00
[52] U.S. Cl. ........................................ 352/69; 352/43; 350/124
[58] Field of Search ...................... 352/69, 43; 350/124

[56] References Cited

U.S. PATENT DOCUMENTS 3,475,086  10/1969  Vetter .................................. 352/69

Primary Examiner—Monroe H. Hayes
Attorney, Agent, or Firm—Mason, Fenwick & Lawrence

[57] ABSTRACT

A motorized bottom masking assembly for variably masking a lower portion of a large curved picture projection screen, including a bottom mask movable to various heights along the lower portion of the screen having a rigid bar member defining the uppermost edge thereof, and at least three bar positioning lift assemblies located entirely below the bar member coupled to the bar member near opposite ends thereof and near the middle of the bar member. Each of the three lift assemblies include an elongated base track, a pair of lift arms arranged in upwardly converging inclined relation having lower end roller carrier assemblies guided by the associated base track movable toward and away from each other and having upper ends coupled together to the member, a lead screw coupled to the roller carrier assemblies, and a drive motor therefor for converging and diverging the associated pair of lift arms relative to each other to raise and lower the bar member relative to the base track.

12 Claims, 4 Drawing Sheets

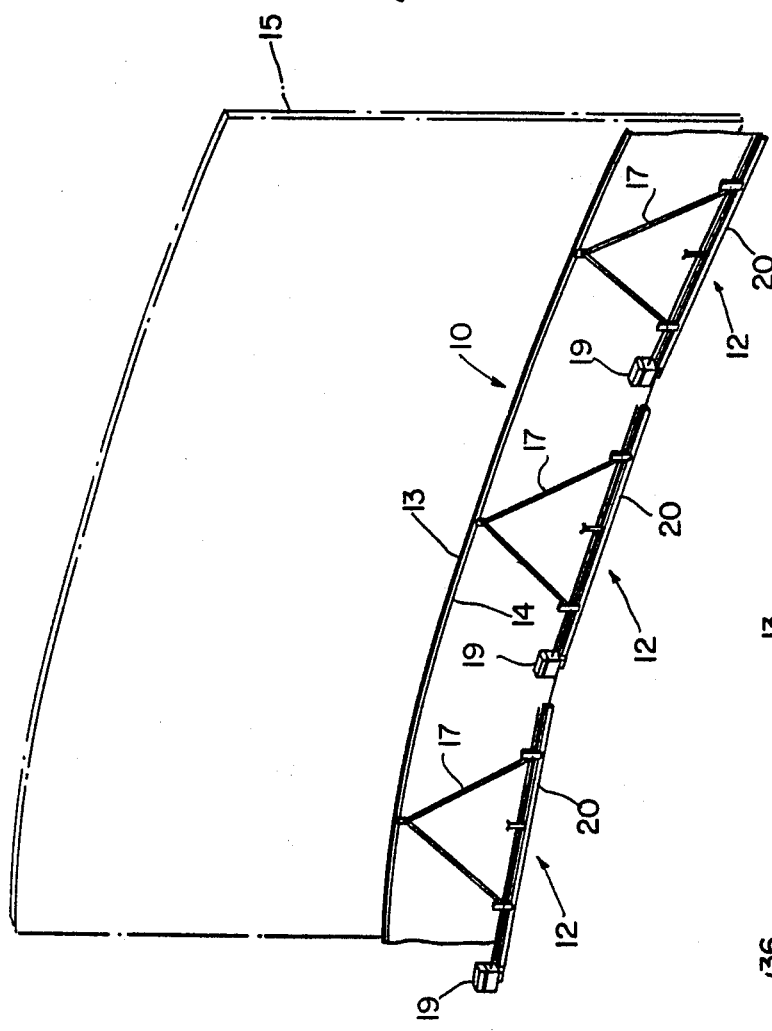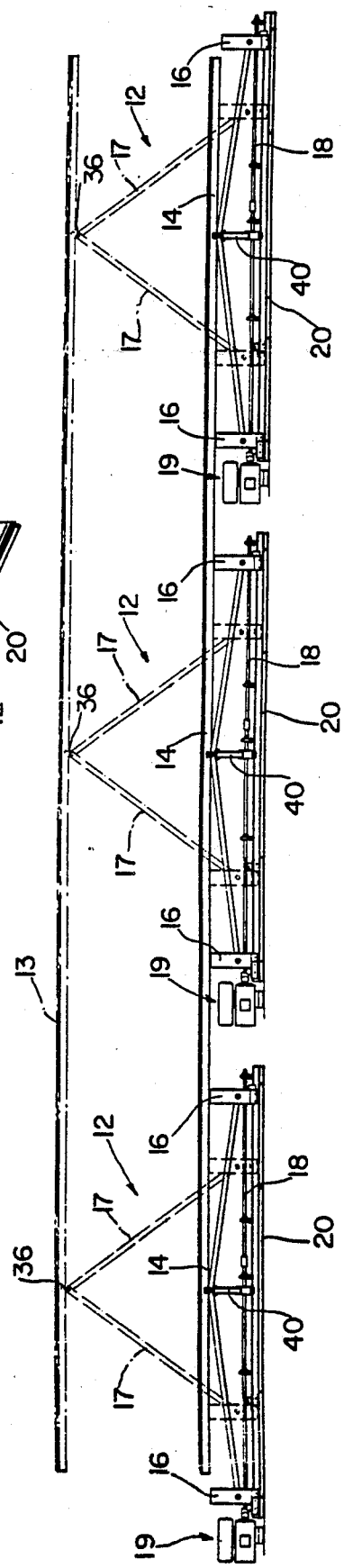

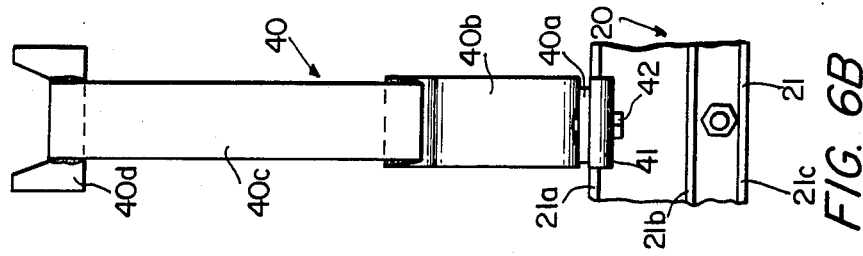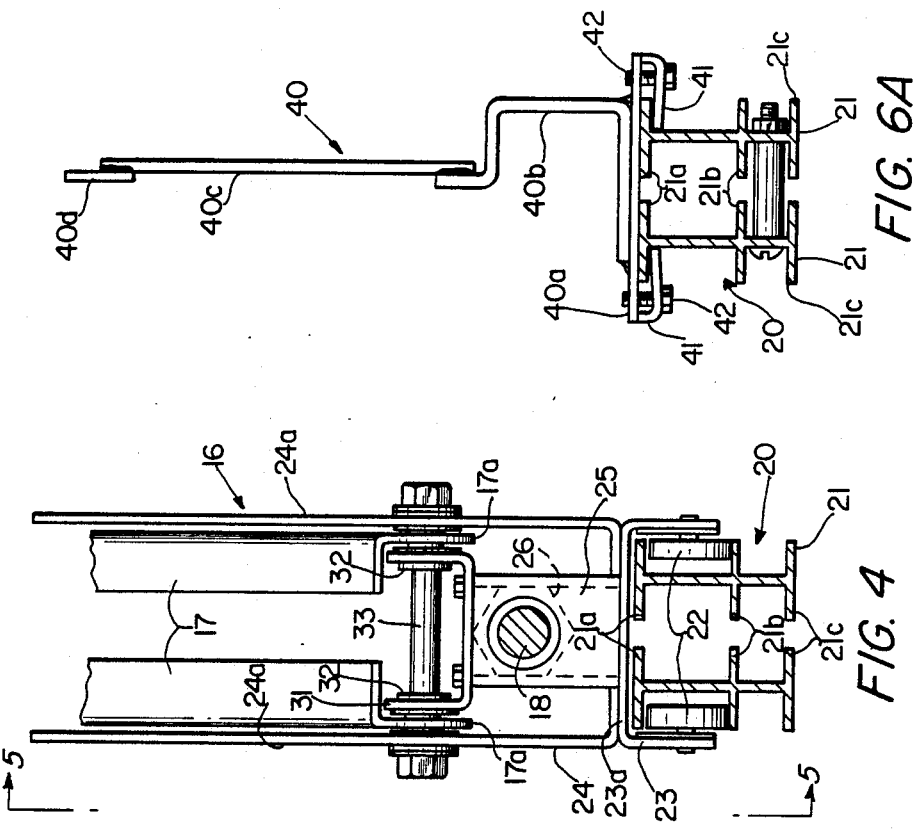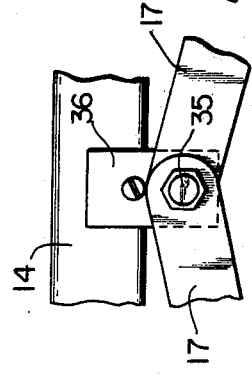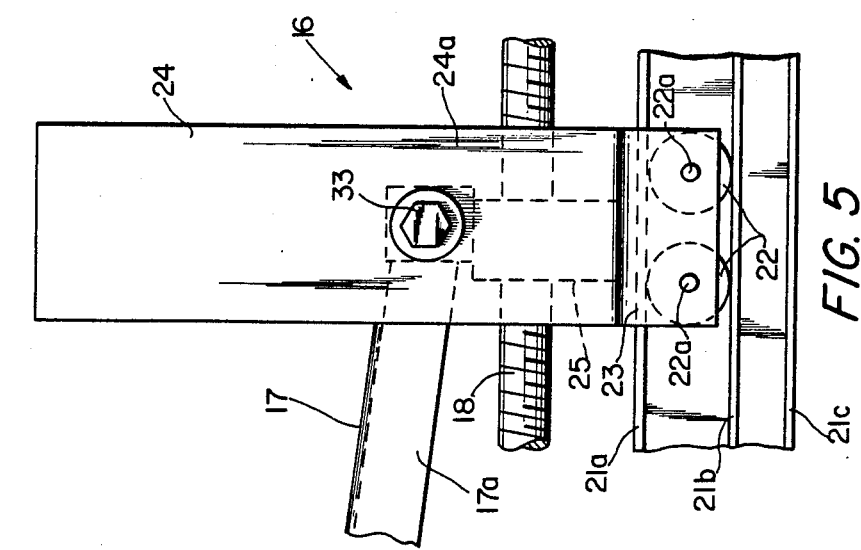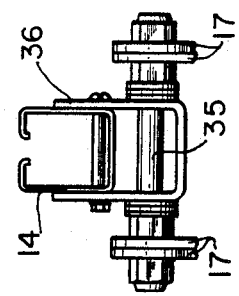

MOTORIZED BOTTOM MASKING DEVICE FOR WIDE AND/OR CURVED MOTION PICTURE SCREENS

BACKGROUND AND OBJECTS OF THE INVENTION

The present invention relates, in general, to projection screen masking systems, and more particularly to motorized bottom masking apparatus for motion picture screens, particularly wide and/or curved motion picture screens.

Since the size of the image projected onto the screen in a motion picture theater can vary depending upon the type of film being shown, the projection screen is customarily designed to accept the largest image to be shown and is then "masked", or reduced in size by a masking system, for showing smaller pictures. This masking system usually is motor-operated and comprises dark fabric mask sections which are lowered at the top of the screen and sometimes drawn toward the center of the screen from each side. Sometimes, top masking only is used, boundaries of the projection screen is used, and sometimes masking at the top and both sides, or at the top and bottom and both sides, is employed.

On small straight projection screens, bottom masking can be employed, in addition to the top masking, or the top masking and side masking, by providing cables running along the sides of the screen which lift the bottom masking to the desired elevational level. With larger screens, especially with curved screens, lifting of the bottom mask by cables running along the sides of the screen becomes virtually impossible, because the bottom masking structure sags and twists. It is not possible to provide intermediate lift cables, because this would involve running them down in front of the screen and thus would distort the image seen by the viewers. If bottom masking is simply not used, the bottom of the screen must be left bare when smaller films are shown, because the center of focus of the projector cannot easily be lowered to bring the bottom margin of the projected image down to the bottom of the screen.

An object of the present invention is the provision of a motorized bottom masking assembly for a large curved projection screen, for example, a theater screen about 42 feet wide, wherein masking is operated by motorized lift structure located entirely below the bottom masking section, eliminating the need for lift cables depending from ceiling or overhead structure above the screen and yet maintaining true horizontal alignment of the upper edge of the bottom mask without center sagging.

Another object of the present invention is the provision of a motorized bottom masking assembly for large curved projection which provides rapid raising and lowering of the bottom masking by a motorized system not involving hydraulics, and which is mounted on the floor of the theater stage below the projection screen. In a preferred embodiment, the bottom masking system involves three motorized jacks supporting a curved aluminum pipe or channel which forms the top edge of the bottom masking, the jacks being operated by variable speed DC motors which can be set to raise and lower the pipe or channel in unison at the required speed.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a fragmentary perspective view of the motorized bottom masking device for motion picture screens and the like, embodying the present invention, shown adjacent a large curved theater projection screen shown partially and sectioned;

FIG. 2 is a front elevational view thereof, with all of the three motorized track elevating and lowering support assemblies shown;

FIG. 4 is a fragmentary vertical section view, taken along the line 4—4 of FIG. 3;

FIG. 5 is a fragmentary front elevational view of the movable carrier portion, taken along the line 5—5 of FIG. 4;

FIGS. 6A and 6B are fragmentary vertical section views to enlarged scale, showing a section of the track support assembly, taken along the line 6—6 of FIG. 3 and a front elevation view thereof; and FIGS. 7A and 7B are vertical section views of the center connector assembly connected to the top edge channel, taken along the line 7A—7A of FIG. 3 and 7B—7B of FIG. 7A.

DETAILED DESCRIPTION OF A PREFERRED EMBODIMENT

Figure 3:
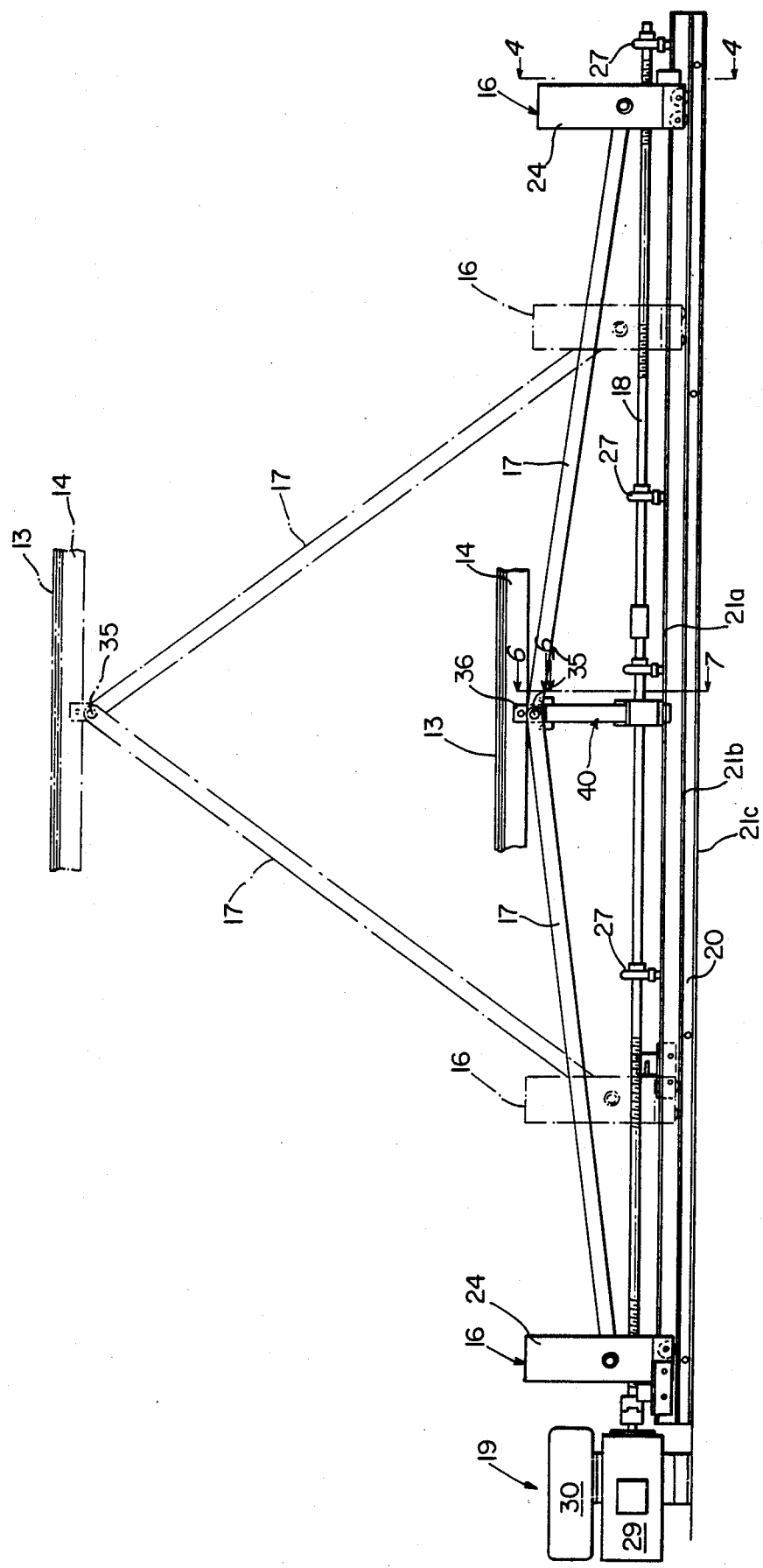
FIG. 3 is a front elevational view, to larger scale, of one of the motorized mask section raising and lowering assemblies, shown in lowered position and solid lines and in raised position in broken lines.

Referring to the drawings, wherein like reference characters designate corresponding parts throughout the several figures, and particularly to FIGS. 1 and 2, the motorized bottom masking apparatus for motion picture screens, embodying the present invention, is indicated generally by the referenced character 10, and, in general, comprising three motorized bottom mask raising and lowering units 12 for raising and lowering the top edge of the bottom masking section 13, and in this case formed by a long curved aluminum pipe 14 located forwardly adjacent the theater projection screen 15 and curved to conform generally to the curvature of the projection screen 15. As shown at one of the three units 12 in FIG. 1, and as shown in greater detail in FIGS. 2 and 3, the bottom masking raising and lowering devices are disposed adjacent the two opposite ends, and substantially at the center, of the curved aluminum pipe or channel 14 and each comprise a bottom channel forming a roller track for wheels of a pair of carrier devices 16 pivotally affording a pair of support arms 17 which are coupled at their upper ends to a track coupling assembly supporting the top edge of the bottom masking section 13, such as the pipe or channel 14, and which are drawn together and driven apart by a lead screw 18 driven by a motor assembly 19.

More specifically, each of the three bottom mask raising and lowering units 12 includes a base-forming bottom track channel 20 made of up two I beam members 21 having a top flange 21a, an intermediate flange 21b and a bottom flange 21c. These flanges define outwardly facing track channels between the flanges 21a, 21b, for pairs of wheels 22 journalled on rivet 22a carried in the depending sides of an inverted U-shaped wheel supporting strap member 23 having a horizontal base web 23a fixed, as by welding, to a U-shaped carrier body member 24. In the lower region of the carrier body member is a supporting block structure 25 and fixed nut 26 threaded onto the long lead screw 18 journaled in pillow blocks 27 fixed to the upper portion of the channel 20.

One end of the lead screw 18 is connected by a coupling 28 to the output shaft of a variable speed DC motor 29, mounted on a motor bracket and having a motor control box 30 associated therewith.

Also incorporated in the carrier body assembly and fixed to the upper end of the support block 25 is a U-shaped support member 31 having bearings 32 supported by the ascending arms thereof, journaling a shaft or pin 33 extending through the upright arms forming the front and rear sides 24a of the U-shaped carrier body member 24. A pair of angle iron arms 17 are provided with holes in the lower end portions of the vertical flanges 17a thereof through which the shaft or pin 33 extends to form a pivot connection for the lower end portions of the support arms 17. The upper end portions of the support arms 17 are also provided with holes to receive a pivot pin or shaft 35 which also extends through a channel or pipe supporting U-shaped bracket 36 fixed to the pipe or channel 14 forming the upper edge of the bottom mask section.

To support the bracket 36 and adjoining portion of the top-edge-forming pipe or channel 14 of the bottom mask section 13 at each of the three units 12 when in the lowered position, a stationary center support assembly 40 is provided, comprising a bottom plate portion 40a secured by clamp members 41 and screws 42 to the top flange 21a of the base channel 21, and having a generally C-shaped foot portion 40b welded at its bottom to the plate portion 40a, an upwardly extending leg portion 40b, and a notched or generally U-shaped rest formation 40c at the upper edge thereof providing a recess into which the U-shaped bracket member 36 connected to the lift arms 17 and the top edge pipe or channel 14 will be received and supported at the lowered limit position of the bottom masking pipe or channel 14.

It will be apparent that, with this structure the bottom masking section 13 can be readily raised to the elevated position for projector film requiring the smallest size screen, by energizing the motor 29 to drive the lead screw 18 in the appropriate direction to move the carrier body members 24 from the lower limit position, shown in solid lines in FIG. 3, to the upper limit position shown in broken lines in FIG. 3, by driving the carrier body members 24 toward each other to the broken line positions. During such movement of the carrier body members 24, the arms 17 are progressively driven to increasingly upwardly inclined positions, by converging the lower end portions thereof toward each other, and thus increasing the altitude of the triangle formed thereby and raising the pipe or channel 14 forming the upper edge of the bottom masking section to the desired height. A limit switch as shown at 42 may be fixed on the base track channel 20 at the proper position to be engaged by the carrier body member 24 when it reaches the upper limit position shown in broken lines in FIG. 3 to automatically deenergize the drive motor 29. In one satisfactory embodiment, the base channel 20 is about 11 feet long, the lift arms 17 are about 5 feet long, with the holes in the opposite ends thereof spaced about 59 inches on center, the top of the masking section 13 is not more than 17 inches off of the floor of the stage when lowered, and the top of the masking 13 is elevated to a raised position almost five feet above the floor in the maximum raised position.

What I claim is:

1. A motorized bottom masking assembly for variably masking a lower portion of a large curved picture projection screen, comprising a bottom mask movable to various heights along the lower portion of the screen, the mask having a substantially horizontal elongated rigid bar member defining the uppermost edge thereof, at least three bar positioning lift means located entirely below the bar member coupled to the bar member at first and second locations adjacent opposite ends of the bar member and at a third intermediate location therebetween; each of the three lift means including an elongated base track, a pair of lift arms arranged in upwardly converging inclined relation having lower end roller assemblies guided by the associated base track movable toward and away from each other and having upper ends coupled together to the bar member, a lead screw coupled to said roller assemblies and a drive motor therefor for converging and diverging the associated pair of lift arms relative to each other to raise and lower the bar member relative to the base track and thereby selectively vary the vertical distance spanned by the bottom mask.

2. A bottom masking assembly as defined in claim 1, wherein said base track includes a pair of oppositely laterally facing track channels, and said roller assemblies comprising carrier assemblies pivotally coupled to the lower ends of the respective lift arms of each pair of lift arms and having a pair of laterally spaced rollers extending into and tracking in the oppositely facing track channels of the associated base track.

3. A bottom masking assembly as defined in claim 2, wherein said carrier assemblies include a pair of vertical parallel side plates laterally flanking the associated base track and embracing the base track therebetween and having a threaded pillow block in each said carrier assembly threaded onto said lead screw.

4. A bottom masking assembly as defined in claim 1, wherein said bar member is curved to conform substantially to the curvature of and be located in forwardly spaced relation to said curved picture projection screen, and the base track for each of the three lift means being an elongated track member located below and arranged generally parallel to the curved track portion located thereabove, and said drive motor for each of the lift means being located at the corresponding end of the associated base track.

5. A bottom masking assembly as defined in claim 2, wherein said bar member is curved to conform substantially to the curvature of and be located in forwardly spaced relation to said curved picture projection screen, and the base track for each of the three lift means being an elongated track member located below and arranged generally parallel to the curved track portion located thereabove, and said drive motor for each of the lift means being located at the corresponding end of the associated base track.

6. A bottom masking assembly as defined in claim 3, wherein said bar member is curved to conform substantially to the curvature of and be located in forwardly spaced relation to said curved picture projection screen, and the base track for each of the three lift means being an elongated track member located below and arranged generally parallel to the curved track portion located thereabove, and said drive motor for each of the lift means being located at the corresponding end of the associated base track.

7. A bottom masking assembly as defined in claim 1, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar means when said bar means is in a lower most limit position therefor.

8. A bottom masking assembly as defined in claim 2, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar means when said bar means is in a lower most limit position therefor.

9. A bottom masking assembly as defined in claim 3, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar means when said bar means is in a lower most limit position therefor.

10. A bottom masking assembly as defined in claim 4, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar means when said bar means is in a lower most limit position therefor.

11. A bottom masking assembly as defined in claim 5, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar mean when said bar means is in a lower most limit position therefor.

12. A bottom masking assembly as defined in claim 6, including a stationary center support assembly located substantially at the longitudinal mid-point of the base track for each lift means having an upwardly extending leg and a U-shaped rest formation at the top of said leg providing a recess to receive means at the upper ends of said lift arms coupling them together and to the bar means when said bar means is in a lower most limit position therefor.

* * * * *